US009323593B2

(12) United States Patent
Liu et al.

(10) Patent No.: US 9,323,593 B2
(45) Date of Patent: Apr. 26, 2016

(54) METHOD AND DEVICE FOR SAVING RUNNING LOG OF AN OPERATING SYSTEM DURING A SOFT RESET

(71) Applicant: Huawei Technologies Co., Ltd., Shenzhen, Guangdong (CN)

(72) Inventors: Yu Liu, Shenzhen (CN); Zhihui Jia, Shanghai (CN); Cong Yao, Shanghai (CN); Xiang Li, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 351 days.

(21) Appl. No.: 13/869,688

(22) Filed: Apr. 24, 2013

(65) Prior Publication Data

US 2013/0297920 A1    Nov. 7, 2013

(30) Foreign Application Priority Data

Apr. 24, 2012    (CN) .......................... 2012 1 0122042

(51) Int. Cl.
| G06F 11/00 | (2006.01) |
| G06F 1/24 | (2006.01) |
| G06F 1/26 | (2006.01) |
| G06F 11/07 | (2006.01) |

(52) U.S. Cl.
CPC .............. *G06F 11/002* (2013.01); *G06F 1/24* (2013.01); *G06F 1/26* (2013.01); *G06F 11/0742* (2013.01); *G06F 11/0778* (2013.01)

(58) Field of Classification Search
CPC .... G06F 9/4401; G06F 9/4403; G06F 11/002
USPC .......................................................... 713/1
See application file for complete search history.

(56) References Cited

U.S. PATENT DOCUMENTS

| 4,045,661 A | * | 8/1977 | Antoine ................ G06F 11/141 |
| | | | 714/17 |
| 4,855,725 A | * | 8/1989 | Fernandez .............. G06F 3/147 |
| | | | 345/173 |
| 5,072,450 A | * | 12/1991 | Helm .................... G06F 11/073 |
| | | | 714/723 |
| 5,640,357 A | * | 6/1997 | Kakimi ......................... 365/229 |
| 6,711,693 B1 | * | 3/2004 | Golden ..................... G06F 1/14 |
| | | | 713/375 |

(Continued)

FOREIGN PATENT DOCUMENTS

| CN | 1684041 A | 10/2005 |
| CN | 101488881 A | 7/2009 |
| JP | 2005338985 A | 12/2005 |

*Primary Examiner* — Thomas Lee
*Assistant Examiner* — Santosh R Poudel
(74) *Attorney, Agent, or Firm* — Leydig, Voit & Mayer, Ltd.

(57) ABSTRACT

Embodiments of the present application disclose a method for saving a running log, including: when a running exception occurs in an operating system, configuring that a random access memory adapted to record a running log of the operating system works in a self-refresh mode; performing reset on an application processor of the operating system and keeping a power management unit working normally, where the power management unit is adapted to manage power of the application processor and the random access memory; acquiring the running log of the operating system from the random access memory and saving the running log of the operating system, after reset of the application processor is completed. The embodiments of the present application further disclose a device. By adopting the present application, it can be ensured that a log is saved completely during a preset process of the system.

8 Claims, 5 Drawing Sheets

(56) References Cited

U.S. PATENT DOCUMENTS

| | | | |
|---|---|---|---|
| 6,877,112 B1* | 4/2005 | Iino et al. | 714/23 |
| 6,895,515 B1* | 5/2005 | Yamazaki | G06F 1/26 713/1 |
| 7,477,072 B1* | 1/2009 | Kao | H03K 19/17752 326/40 |
| 8,392,695 B1* | 3/2013 | Lachwani et al. | 713/2 |
| 2003/0007409 A1* | 1/2003 | Ishikuri | 365/226 |
| 2004/0004503 A1* | 1/2004 | Fischer et al. | 327/199 |
| 2004/0025146 A1* | 2/2004 | Kurihara et al. | 717/131 |
| 2005/0044275 A1* | 2/2005 | Adamson | H04L 41/00 709/253 |
| 2005/0278584 A1 | 12/2005 | Asami et al. | |
| 2008/0082225 A1* | 4/2008 | Barrett | 701/26 |
| 2008/0320203 A1* | 12/2008 | Fitzgerald | 711/5 |
| 2009/0307409 A1* | 12/2009 | Rogers | G06F 11/1441 711/100 |
| 2010/0218025 A1* | 8/2010 | Saito | 713/324 |
| 2010/0231044 A1* | 9/2010 | Tatsumi | G06F 1/3203 307/39 |
| 2011/0081160 A1* | 4/2011 | Yoon | G03G 15/80 399/88 |
| 2012/0159238 A1* | 6/2012 | Wang | G06F 11/1417 714/6.1 |
| 2012/0265974 A1* | 10/2012 | Shen | G06F 1/24 713/1 |
| 2012/0324251 A1* | 12/2012 | Bolanowski et al. | 713/300 |

* cited by examiner

METHOD AND DEVICE FOR SAVING RUNNING LOG OF AN OPERATING SYSTEM DURING A SOFT RESET

CROSS-REFERENCE TO RELATED APPLICATIONS

This application claims priority to Chinese Patent Application No. 201210122042.3, filed on Apr. 24, 2012, which is hereby incorporated by reference in its entirety.

FIELD OF THE APPLICATION

The present application relates to log storage technologies, and in particular, to a method and device for saving a running log.

BACKGROUND OF THE APPLICATION

Currently, in a running process of a device based on an Android (Android, an operating system) operating system, various exceptional situations often occur in the operating system. In this case, the operating system needs to be reset, so as to eliminate the exceptions.

Currently, a reset manner of the Android operating system is global reset. A process of the global reset is described below with reference to FIG. 1. As shown in FIG. 1, a device 1 based on an Android operating system includes: an AP (Application Processor, application processor) 11, a PMU (Power Management Unit, power management unit) 12 and a RAM (random access memory, random access memory) 13. The AP11 is adapted to run various applications of the Android operating system, and usually, an exception that occurs in the Android operating system refers to an exception that occurs in the applications run by the AP11. The RAM13 is adapted to record a running status of the Android operating system, mainly to record a running status of the AP11. The PMU12 is adapted to manage power of the AP11 and the RAM13. When an exception occurs in the operating system during a running process, the system sends a reset signal to the AP11; after receiving the reset signal, the AP11 forwards the reset signal to the PMU12; after receiving the reset signal, the PMU12 performs reset on itself (that is, power-off and then power-on), and then sends a global reset signal to the AP11 and the RAM13; after receiving the global reset signal of the PMU12, the AP11 and the RAM13 performs reset.

In the foregoing reset process, the PMU12 needs to be reset (that is, powered off and then powered on), causing that a process of power-off and then power-on occurs on the RAM13 correspondingly, so that the running log recorded in the RAM13 is lost. Therefore, technical personnel cannot analyze the exception of the system according to the running log.

SUMMARY OF THE APPLICATION

A technical problem to be solved by embodiments of the present application is to provide a method and device for saving a running log, which can ensure that the log is saved completely during a process that a system is reset.

In order to solve the foregoing technical problem, an embodiment of the present application provides a method for saving a running log, including:

when a running exception occurs in an operating system, configuring that a random access memory adapted to record a running log of the operating system works in a self-refresh mode;

performing reset on an application processor of the operating system, and keeping a power management unit working normally, where the power management unit is adapted to manage power of the application processor and the random access memory; and after the reset of the application processor is completed, acquiring the running log of the operating system from the random access memory and saving the running log of the operating system.

Correspondingly, an embodiment of the present application further provides a device, including:

a configuration module, adapted to, when a running exception occurs in an operating system, configure that a random access memory adapted to record a running log of the operating system works in a self-refresh mode;

a processing module, including: an application processor for running the operating system, a power management unit and the random access memory, where the processing module is adapted to perform reset on the application processor and keep the power management unit working normally, and the power management unit is adapted to manage power of the application processor and the random access memory; and a log processing module, adapted to, after the reset of the application processor is completed, acquire the running log of the operating system from the random access memory and save the running log of the operating system.

Implementation of the embodiments of the present application has the following beneficial effects:

In the embodiments of the present application, when a running exception occurs in the operating system, it is configured that the random access memory works in the self-refresh mode, so as to prevent loss of data stored in the random access memory; then, reset is performed on the application processor, and the power management unit is kept working normally, that is, reset is not performed on the power management unit, thereby avoiding a situation that the random access memory is powered off and then powered on due to the reset (being powered off and then powered on) of the power management unit, so as to ensure that, in a reset process, the running log of the operating system is saved completely, for convenience in subsequent analysis of relevant personnel.

BRIEF DESCRIPTION OF THE DRAWINGS

To describe the technical solutions in the embodiments of the present application, the following briefly introduces accompanying drawings required for describing the embodiments. Apparently, the accompanying drawings in the following descriptions show merely some embodiments of the present application, and persons of ordinary skill in the art may still derive other drawings from the accompanying.

DETAILED DESCRIPTION OF THE EMBODIMENTS

The following clearly describes the technical solutions in the embodiments of the present application with reference to the accompanying drawings in the embodiments of the present application. Apparently, the described embodiments are merely part rather than all of the embodiments of the present application. All other embodiments obtained by persons of ordinary skill in the art based on the embodiments of the present application without creative efforts shall fall within the protection scope of the present application.

Figure 1:
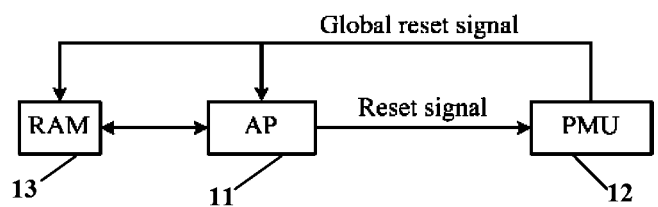
FIG. 1 is a schematic structural diagram of an existing device.
Figure 2:
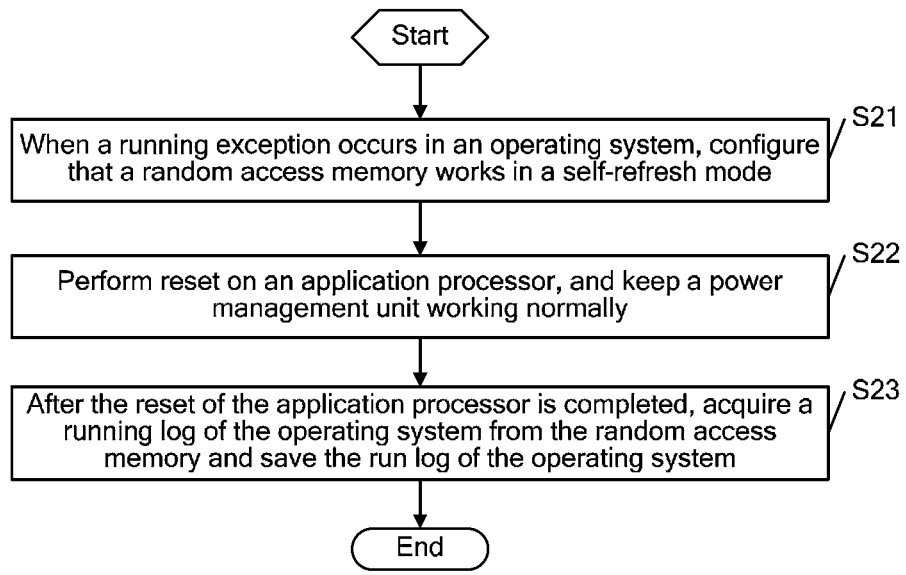
FIG. 2 is a schematic flow chart of an embodiment of a method for saving a running log according to the present application.

Referring to FIG. 2, it is a schematic flow chart of an embodiment of a method for saving a running log according to the present application.

An executor of a procedure of the method in FIG. 2 may be a device such as a smartphone and a tablet personal computer. The device generally include: an application processor (AP), a power management unit (PMU) and a random access memory (RAM). The application processor may run an operating system installed in the device. The power management unit manages power of the application processor and the random access memory. When the power management unit is powered off, the power of the application processor and the random access memory are interrupted. The random access memory preferably is a DDR SDRAM (Double Data Rate Synchronous Dynamic Random Access Memory, double data rate synchronous dynamic random access memory), and is adapted to cache a running status of the operating system in real time. The procedure of the method in FIG. 2 includes:

Step S21: When a running exception occurs in the operating system, configure that the random access memory works in a self-refresh mode.

Because the operating system is generally run in the application processor, that the running exception occurs in the operating system refers to that a running exception occurs in the application processor. For example, the exception may be a phenomenon that a screen gets stuck when the application processor plays an ultra-clear video. In step S21, the running status of the operating system may be monitored in real time by running a monitoring program in a background; and when the monitoring program finds, through monitoring, that a running exception occurs in the operating system, an effective solution is to perform reset on the operating system, that is, to perform reset on the application processor. However, if the reset is directly performed on the application processor, data stored in the random access memory may be lost. Therefore, when an exception occurs in the operating system in step S11, it is first configured that the random access memory works in the self-refresh mode, where the self-refresh mode is a working mode of the random access memory, and can avoid loss of the data stored in the random access memory. Specifically, if the operating system is an Android operating system, in step S11, a panic function in the Android operating system may be invoked and configured, so as to configure that the random access memory works in the self-refresh mode. It should be noted that, the panic function is a performance function which is often used in the Android operating system and is well-known by persons skilled in the art. When a problem occurs in the Android operating system, the system enters an Apanic mode automatically and invokes the panic function.

Step S22: Perform reset on the application processor, and keep the power management unit working normally.

In step S22, keeping the power management unit working normally mainly refers to that reset is not performed on the power management unit, so as to avoid the loss of the data stored in the random access memory due to power interruption of the random access memory that is caused by the reset of the power management unit. The reset of the power management unit refers to that the power management unit is powered off and then powered on.

Step S23: After the reset of the application processor is completed, acquire the running log of the operating system from the random access memory and save the running log of the operating system.

In step S23, after the reset of the application processor is completed, it may be configured that the random access memory works in a normal working mode. After the operating system works normally, the running log of the operating system is acquired from the random access memory and saved.

In this embodiment, when an exception occurs in the operating system, reset is not performed on the power management unit, so a situation that the random access memory is powered off does not occur. Therefore, after the reset of the application processor is completed, the running log of the operating system can be acquired from the random access memory and saved. That is to say, during a reset process, the running log of the operating system is saved completely.

Figure 3:
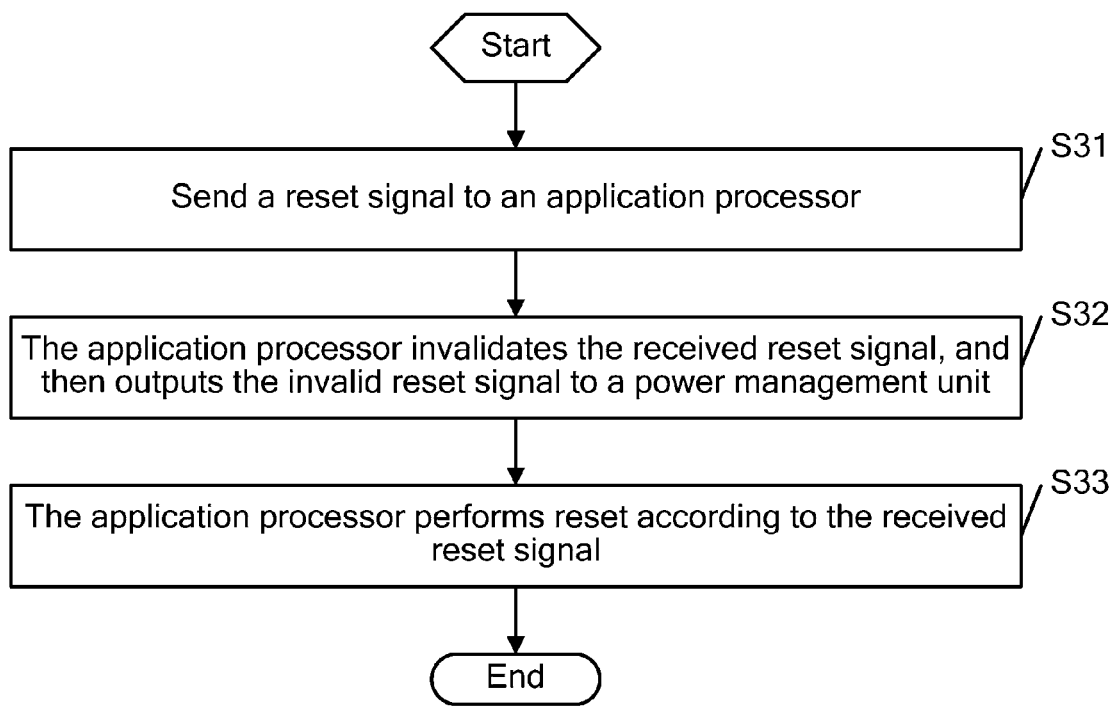
FIG. 3 is a schematic flow chart of a first embodiment of step S22 in FIG. 2.

Referring to FIG. 3, it is a schematic flow chart of a first embodiment of step S22 in FIG. 2. The step S22 includes:

Step S31: Send a reset signal to the application processor.

Step S32: The application processor invalidates the received reset signal, and then outputs the invalid reset signal to the power management unit.

Step S33: The application processor performs reset according to the received reset signal.

Because what is input to the power management unit in step S32 is an invalid reset signal, the power management unit may be kept working normally, thereby avoiding resetting the power management unit. It should be noted that, after receiving the reset signal, the application processor may select a manner of performing reset directly without outputting any signal to the power management unit, so as to achieve a purpose of keeping the power management unit working normally.

Figure 4:
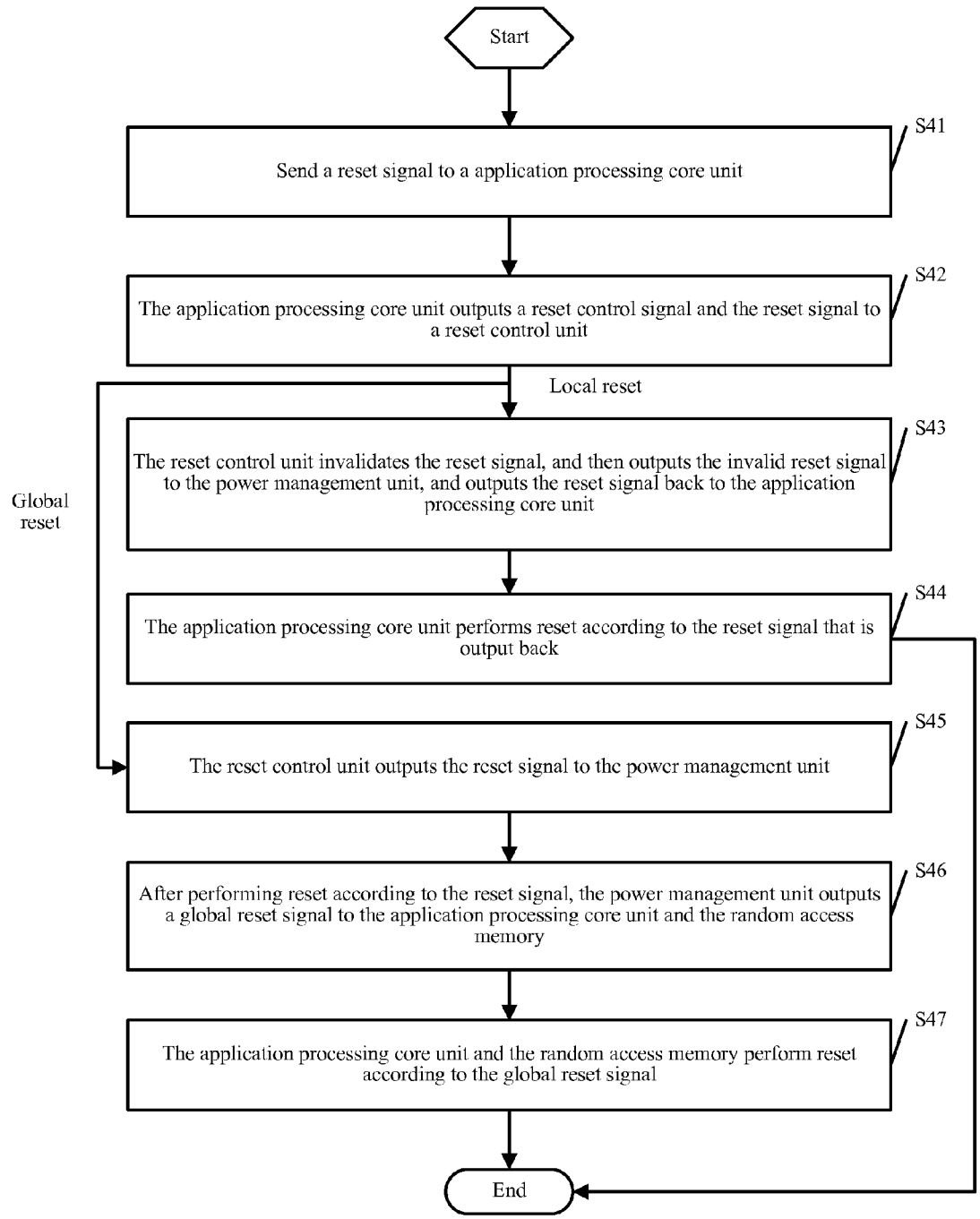
FIG. 4 is a schematic flow chart of a second embodiment of step S22 in FIG. 2.

Referring to FIG. 4, it is a schematic flow chart of a second embodiment of step S22 in FIG. 2. In this embodiment, the application processor includes: an application processing core unit and a reset control unit. The step S22 includes:

Step S41: Send a reset signal to the application processing core unit.

Step S42: The application processing core unit outputs a reset control signal and the reset signal to the reset control unit.

When the reset control signal is used to indicate performing local reset, step S43 is performed; and when the reset control signal is used to indicate global reset, step S45 is performed.

The reset control signal may be pre-configured in the application processing core unit. Alternatively, the reset control signal may be sent at the same time when the reset signal is sent to the application processing core unit in step S41.

Step S43: The reset control unit invalidates the reset signal, and then outputs the invalid reset signal to the power management unit, and outputs the reset signal back to the application processing core unit.

Step S44: The application processing core unit performs reset according to the reset signal that is output back, and the procedure is ended.

Step S45: The reset control unit outputs the reset signal to the power management unit.

Step S46: After performing reset according to the reset signal, the power management unit outputs a global reset signal to the application processing core unit and the random access memory.

Step S47: The application processing core unit and the random access memory perform reset according to the global reset signal.

In this embodiment, the reset control unit implements control on the local reset and the global reset according to the reset control signal, so that reset manners of this embodiment are more flexible and abundant.

The following will describe a device in an embodiment of the present application.

Figure 5:
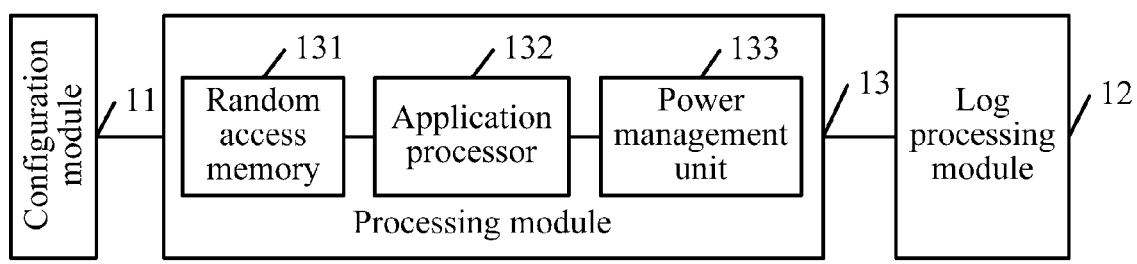
FIG. 5 is a schematic structural diagram of an embodiment of a device according to the present application.

Referring to FIG. 5 it is a schematic structural diagram of an embodiment of a device according to the present application. The device includes: a configuration module 11, a processing module 13 and a log processing module 12, where the processing module 13 includes a random access memory 131, an application processor 132 and a power management unit.

The configuration module 11 is adapted to, when a running exception occurs in an operating system, configure that the random access memory works in a self-refresh mode.

Because the operating system is generally run in the application processor, that the running exception occurs in the operating system refers to that a running exception occurs in the application processor. For example, the exception may be a phenomenon that a screen gets stuck when the application processor plays an ultra-clear video. A running status of the operating system may be monitored in real time by running a monitoring program in a background; and when the monitoring program finds, through monitoring, that a running exception occurs in the operating system, an effective solution is to perform reset on the operating system, that is, to perform reset on the application processor. However, if the reset is directly performed on the application processor, data stored in the random access memory may be lost. Therefore, when an exception occurs in the operating system, it is first configured by the configuration module 11 that the random access memory works in the self-refresh mode, where the self-refresh mode is a working mode of the random access memory, and can avoid loss of the data stored in the random access memory. Specifically, if the operating system is an Android operating system, the configuration module 11 may configure, by invoking a panic function in the Android operating system and configuring the panic function, that the random access memory works in the self-refresh mode.

The processing module 13 is adapted to perform reset on the application processor 132, and keep the power management unit 133 working normally.

That the processing module 13 keeps the power management unit 133 working normally mainly refers to that reset is not performed on the power management unit 133, so as to avoid the loss of the data stored in the random access memory 131 due to power interruption of the random access memory 131 that is caused by the reset of the power management unit 133. The reset of the power management unit 133 refers to that the power management unit 133 is powered off and then powered on.

The log processing module 12 is adapted to, after the reset of the application processor 132 is completed, acquire the running log of the operating system from the random access memory 131 and save a running log of the operating system.

After the reset of the application processor is completed, it may be configured that the random access memory works in a normal working mode. After the operating system works normally, the log processing module 12 acquires the running log of the operating system from the random access memory and saves the running log of the operating system.

In this embodiment, when an exception occurs in the operating system, reset is not performed on the power management unit, so a situation that the random access memory is powered off does not occur. Therefore, after the reset of the application processor is completed, the running log of the operating system can be acquired from the random access memory and saved. That is to say, during a reset process, the running log of the operating system is saved completely.

Figure 6:
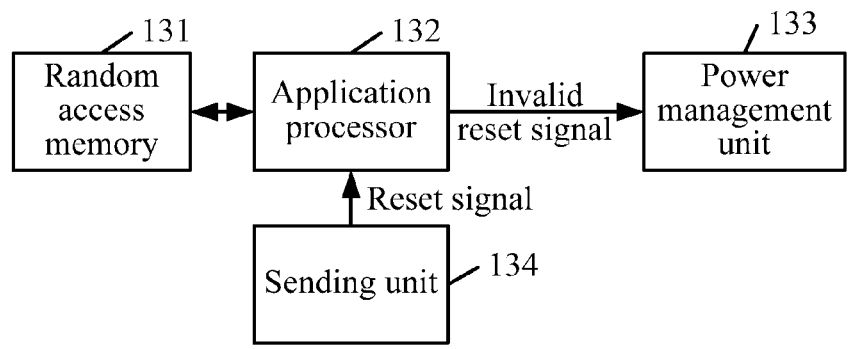
FIG. 6 is a schematic structural diagram of a first embodiment of a processing module in FIG. 5.

Referring to FIG. 6, it is a schematic structural diagram of a first embodiment of a processing module 13 in FIG. 5. In addition to the foregoing random access memory 131, the application processor 132 and the power management unit 133, the processing module 13 further includes:

a sending unit 134, adapted to send a reset signal to the application processor 132.

The application processor 132 is adapted to invalidate the received reset signal, and then output the invalid reset signal to the power management unit 133.

The application processor 132 is further adapted to perform reset according to the received reset signal.

Because what is input by the application processor 132 to the power management unit 133 is an invalid reset signal, the power management unit 133 may be kept working normally, thereby avoiding resetting the power management unit 133. It should be noted that, after receiving the reset signal, the application processor 132 may select a manner of performing reset directly without outputting any signal to the power management unit 133, so as achieve a purpose of keeping the power management unit 133 works normally.

Figure 7:
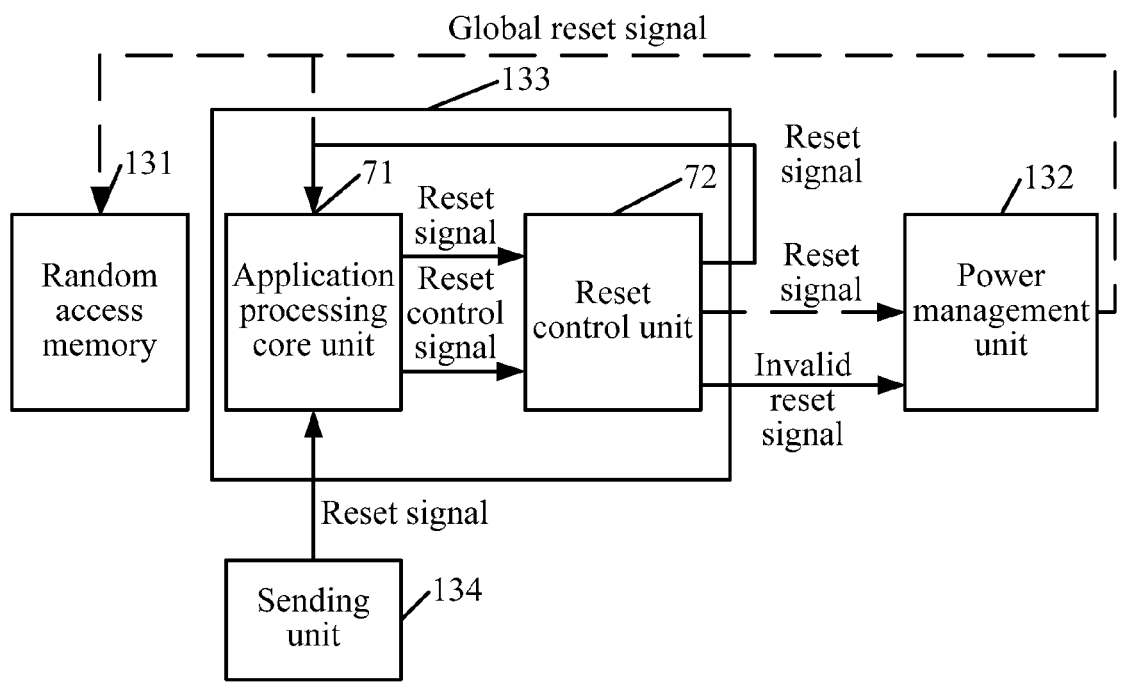
FIG. 7 is a schematic structural diagram of a second embodiment of a processing module in FIG. 5.

Referring to FIG. 7, it is a schematic flow chart of a second embodiment of the processing module 13 in FIG. 5. In this embodiment, the application processor 133 includes: an application processing core unit 71 and a reset control unit 72.

A sending unit 134 is adapted to send a reset signal to the application processing core unit 71.

The application processing core unit 71 is adapted to output a reset control signal and the reset signal to the reset control unit.

The reset control signal may be pre-configured in the application processing core unit 71. Alternatively, the reset control signal may be sent at the same time when the sending unit 134 sends the reset signal to the application processing core unit 71.

The reset control unit 72 is adapted to, when the reset control signal indicates performing local reset, invalidate the reset signal, and then output the invalid reset signal to the power management unit 132, and output the reset signal back to the application processing core unit 71.

The application processing core unit 71 is adapted to perform reset according to the reset signal that is output back.

The reset control unit 72 is further adapted to output the reset signal to the power management unit 132, when the reset control signal indicates performing global reset.

The power management unit 132 is adapted to output a global reset signal to the application processing core unit 71 and the random access memory 131 after performing reset according to the reset signal.

The application processing core unit 71 and the random access memory 131 are adapted to perform reset according to the global reset signal.

Figure 8:
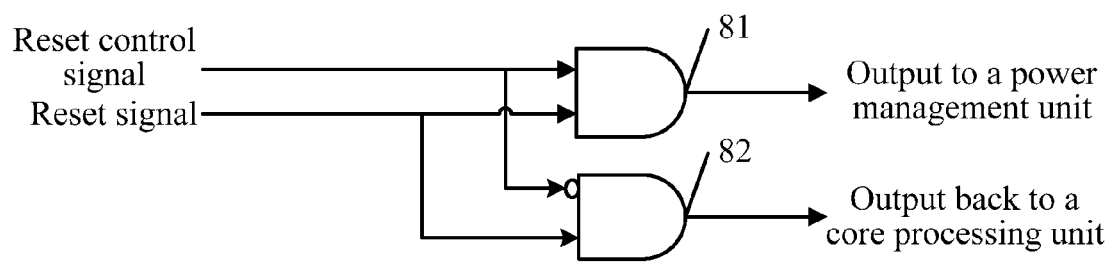
FIG. 8 is a schematic structural diagram of an embodiment of a reset control unit in FIG. 7.

Further, the reset control unit 72 may be implemented by an AND gate 81 and a NAND gate 82 that are shown in FIG. 8. As shown in the drawing, when the reset control signal is "1" and the reset signal is "1", the AND gate 81 outputs "1" to the power management unit, the NAND gate 82 outputs "when the reset control signal is '0'" to the application core processing unit 71; and when the reset control unit is "0" and the reset signal is "1", the AND gate 81 outputs "0" to the power management unit, and the NAND 82 outputs "1" to the application core processing unit 71. That the reset control signal is "1" represents the global reset, and that the reset control signal is "0" represents the local reset.

In this embodiment, the reset control unit implements control on the local reset and the global reset according to the reset control signal, so that reset manners of this embodiment are more flexible and abundant.

Persons of ordinary skill in the art may understand that all or part of the procedures of the methods in the foregoing embodiments may be implemented by a computer program instructing relevant hardware. The program may be stored in a computer readable storage medium. When the program runs, the procedures of the foregoing method embodiments are performed. The storage medium may be a magnetic disk, an optical disk, a read-only memory (Read-Only Memory, ROM), a random access memory (Read-Only Memory, RAM), or the like.

The foregoing disclosures are merely exemplary embodiments of the present application, and are not intended to limit the scope of rights of the present application. Persons of ordinary skill in the art can understand and implement all or part of the procedures in the foregoing embodiments, and equivalent variations made according to the claims of the present application still falls within the scope of the present application.

What is claimed is:

1. A method for saving a running log of an operating system when a running exception occurs in the operating system, the method comprising:
   receiving a reset signal at an application processing core unit in an application processor (AP) of the operating system from a sending unit;
   outputting, by the application processing core unit, a reset control signal and the reset signal to a reset control unit in the AP when the application processing core unit receives the reset signal;
   when the reset control signal is used to indicate performing a local reset, invalidating, by the reset control unit, the reset signal, and then outputting the invalid reset signal to a power management unit (PMU), and outputting the reset signal back to the application processing core unit;
   performing, by the application processing core unit, the local reset of the AP according to the reset signal that is output back while maintaining power to the PMU and a random access memory (RAM) wherein during the local reset of the AP, the PMU does not cut off power to the AP; wherein the PMU is adapted to manage power of the AP and the RAM; and
   after the local reset of the AP is completed, acquiring the running log of the operating system from the RAM and saving the running log of the operating system in a log processing module.

2. The method according to claim 1, further comprising:
   when the running exception occurs in the operating system, configuring the RAM to enter a self-refresh mode.

3. The method according to claim 2, wherein the configuring the RAM to enter the self-refresh mode comprises:
   when a running exception occurs in an Android operating system, invoking a panic function in the Android operating system, and configuring, the RAM to enter the self-refresh mode, by configuring the panic function.

4. The method according to claim 1, wherein,
   when the reset control signal is used to indicate performing global reset, the reset control unit outputs the reset signal to the PMU;
   after performing the reset according to the reset signal, the PMU outputs a global reset signal to the application processing core unit and the RAM; and
   performing, by the application processing core unit and the RAM, the global reset according to the global reset signal.

5. A device for saving a running log of an operating system when a running exception occurs in the operating system, the device comprising:
   a processing module, comprising: an application processor (AP) for running the operating system, a power management unit (PMU) and a random access memory (RAM), wherein the AP comprises: an application processing core unit and a reset control unit;
   wherein the application processing core unit is configured to:
      receive a reset signal at the AP from a sending unit,
      output, a reset control signal and the reset signal to the reset control unit
   when the application processing core unit receives the reset signal;
   when the reset control signal is used to indicate performing a local reset, the reset control unit is configured to invalidate the reset signal, and then output the invalid reset signal to the PMU, and output the reset signal back to the application processing core unit;
   the application processing core unit is configured to perform the local reset of the AP according to the reset signal that is output back while maintain power to the PMU and the RAM, wherein during the local reset of the AP, the PMU does not cut off power to the AP, and the PMU is adapted to manage power of the AP and the RAM; and
   a log processing module, adapted to, after the local reset of the AP is completed, acquire the running log of the operating system from the RAM, and save the running log of the operating system.

6. The device according to claim 5, further comprising:
   a configuration module adapted to, when the running exception occurs in the operating system, configure, the RAM to enter a self-refresh mode.

7. The device according to claim 6, wherein,
   the configuration module is further adapted to, when a running exception occurs in an Android operating system, invoke a panic function in the Android operating system, and configure, the RAM to enter the self-refresh mode, by configuring the panic function.

8. The device according to claim 5, wherein,
   the reset control unit is adapted to output the reset signal to the PMU when the reset control signal is used to indicate performing global reset;
   the power management unit is adapted to output a global reset signal to the application processing core unit and the RAM after performing the local reset according to the reset signal; and
   the application processing core unit and the RAM are adapted to perform the global reset according to the global reset signal.

* * * * *